US006655256B2

United States Patent
Niessen

(10) Patent No.: US 6,655,256 B2
(45) Date of Patent: Dec. 2, 2003

(54) END STOPS FOR DUAL END STOP ACTUATOR AND METHOD

(76) Inventor: Leopold J. Niessen, P.O. Box 876, Gosport, Hampshire (GB), PO12 2NF ( * ) Notice: Subject to any disclaimer, the term of this patent is extended or adjusted under 35 U.S.C. 154(b) by 0 days.

This patent is subject to a terminal disclaimer.

(21) Appl. No.: 10/126,001

(22) Filed: Apr. 19, 2002

(65) Prior Publication Data

US 2002/0108493 A1 Aug. 15, 2002

Related U.S. Application Data

(63) Continuation of application No. 09/736,618, filed on Dec. 14, 2000.

(51) Int. Cl.$^7$ ................................................ F15B 15/22
(52) U.S. Cl. .......................... 92/13.5; 251/285; 92/120
(58) Field of Search .................... 92/13.5, 13.7, 92/120, 136; 251/285, 286

(56) References Cited

U.S. PATENT DOCUMENTS

| 4,295,630 A | * | 10/1981 | Card et al. | 251/14 |
| 5,139,230 A | * | 8/1992 | Lester | 251/286 |
| 5,259,589 A | * | 11/1993 | Posner | 251/286 |

* cited by examiner

Primary Examiner—Edward K. Look
Assistant Examiner—Thomas E. Lazo
(74) Attorney, Agent, or Firm—Kenneth L. Nash

(57) ABSTRACT

A dual end stop is provided for setting precise open and closed positions for the valve to which the pneumatic actuator is attached. In a preferred embodiment, a stop assembly housing contains two stop adjustment bolts as well as a cam that defines first and second stop surfaces. The stop assembly housing is preferably mounted to the actuator housing outside of the pressurized zone contained by the actuator housing. The stop bolts and associated threaded apertures are designed for minimum overhang of the stop bolts to provide more support. The stop assembly housing not only preferably houses the stop assembly components but also preferably serves as an adaptor plate for the various valves to which the actuator may be mounted.

10 Claims, 5 Drawing Sheets

END STOPS FOR DUAL END STOP ACTUATOR AND METHOD

This application is a continuation of U.S. patent application Ser. No. 09/736,618 filed Dec. 14, 2000.

BACKGROUND OF THE INVENTION

1. Field of the Invention

The present invention relates generally to rotary valve actuators and, more particularly, to apparatus and methods for a dual end stop actuator adjustment.

2. Description of the Background

Actuators, such as a piston activated pneumatic actuators, are well known in the prior art for controlling valves between an open position and a closed position. An exemplary and highly compact configuration for a pneumatic actuator is shown in U.S. Pat. No. 4,354,424, issued Oct. 19, 1982, to Sven Nordlund, which is hereby incorporated herein by reference. In that actuator, each actuator piston is provided with a rack having teeth thereon to engage corresponding teeth of an operating element. The rack includes a recess for receiving a first spring that produces a return force on the piston. The recess extends substantially into the rack of the piston. A second shorter spring is provided within a central portion of each actuator piston. Thus, one spring in each piston is offset from the center and is longer than the other spring. The offset, longer spring provides a solution to a basic problem of compact spring return actuators. Prior to this invention, such actuators did not consistently have sufficient spring force to completely close the valve.

Many valves have requirements for drift adjustments that adjust the valve position to an exactly open position and/or an exactly closed position. For these cases, if the valve is not adjusted correctly, the flow path through the valve may not be completely open or accurately closed due to an offset in the valve control element. If the flow path is not accurately controlled, then the system efficiency may be reduced, failures may occur, and maintenance costs may increase. Thus, it is often desirable to have a drift adjustment, or end stop adjustment, for adjusting the valve element for a more precise desired open and closed position. A dual end stop adjustment in the actuator, which is known in the prior art, permits adjustment of the open and closed position for the valve by adjusting the extent of movement of the valve actuator control element. For a rotational valve actuator element, it is known that a dual end stop adjustment has been used to provide two rotational stop positions for the rotational valve element.

The dual end stop adjustment may be used for many thousands of valve openings and valve closings over the lifetime of operation. Prior art end stop adjustments have a tendency change in drift or stop adjustment over time due to many openings and closings to thereby possibly cause deleterious operation of the valve system, significantly increase maintenance costs, and decrease overall system efficiency.

Prior art pneumatic actuators provide that the dual stop adjustment is sealed within the pressure zone of the actuator housing. Thus, the pressurized air, fluid, gas, and the like, used to activate the valve is present at the stop adjustment mechanism. The inventor of the present invention considers this construction to be faulty and may lead to failures and inaccuracies in the stop adjustment. One of the problems is that the pressurized housing is typically limited in size available for actuator mounting so that for a desired piston size, the thickness of the housing is also accordingly limited. The adjustment bolts must therefore extend through the relatively thin wall of the housing so as to be substantially unsupported along their length. Due to this lack of support of the bolts and the relatively thin actuator wall, there is a tendency for bending and warping in prior art actuators either in the bolts or the actuator wall. Thus, the thousands of openings and closings of the valve may well lead to an unstable or effectively non-operational drift adjustment thereby potentially causing valve and/or valve system malfunctions.

The inventor has discovered other problems with existing dual stop adjustments for pneumatic actuators. One such problem concerns end stop bolts for engaging a stop surface wherein the flat head of the end stop bolt is subject to deformation, high spots, and the like which may result in an unstable drift adjustment. Another problem discovered by the inventor relates to the mounting or adaptor plate used to secure the actuator to various types of valves which plates thereby adapt the actuator to the particular type of valve. Prior art mounting plates are supported and positioned by bolts that are subject to offsets, bending, and warping which leads to inaccuracies in the dual end stop adjustments as well as the connection to the valve which may require high accuracy to standards, such as for instance, ISO standards. Another discovered problem relates to the machining cost of drilling numerous holes in the mounting plates for support bolts. Depending on the location of the bolts, this can result in additional machining operations so that, according to the inventor, it would be desirable to achieve additional reliability and accuracy with a reduced number of mounting bolt holes. Yet another discovered problem relates to bending and offsets of the rotary drive shaft element due to torque applied to the rotary drive shaft element by the stop adjustment. Yet other discovered problems relate to stress in the mechanical supports for the dual end stop adjustment.

Consequently, there remains a need for a more reliable, consistent, and stable dual end stop adjustment that solves the above-listed unaddressed problems and other problems of prior art pneumatic actuator dual end stop adjustment mechanisms. Those skilled in the art have long sought and will appreciate the present invention which provides solutions to these and other problems.

SUMMARY OF THE INVENTION

The present invention was designed to provide more accurate and reliable operation of a pneumatic actuator to thereby more accurately control valve openings and closings over a lifetime of operation and to avoid deleterious changes that may greatly increase maintenance costs and reduce efficiency of a system of valves.

Therefore, it is an object of the present invention to provide an improved pneumatic actuator.

Another object of the present invention is to provide an improved dual end stop adjustment for a pneumatic actuator.

Yet another object of the present invention is to provide a dual end stop adjustment that does not vary in adjustment even after many, many, thousands of openings and closings of the valve.

These and other objects, features, and advantages of the present invention will become apparent from the drawings, the descriptions given herein, and the appended claims.

Therefore, the present invention may provide for a dual end stop for a pneumatic actuator wherein the pneumatic actuator comprises an actuator housing which has a zone for pressure containment. A rotary drive element is mounted for rotation within the actuator housing. The apparatus comprises elements such as a stop element mounted to the rotary drive element for rotation therewith. The stop element has a first stop surface and a second stop surface. The stop element may preferably be positioned outside of the zone for pressure containment. A first stop member is utilized for engaging the first stop surface. The first stop member, in a preferred embodiment, may be mounted outside of the zone for pressure containment. A second stop member is also utilized for engaging the second stop surface and the second stop member may also preferably be mounted outside of the zone for pressure containment.

In a preferred embodiment, a first bearing is mounted on the rotary drive element on a first side of the stop element. A second bearing is mounted on a second side of the stop member opposite to the first side. In a presently preferred embodiment, the first bearing is mounted in the actuator housing adjacent a stop assembly housing and the second bearing is mounted in the stop assembly housing.

The stop assembly housing may preferably be provided defining an aperture therein.

The stop assembly housing may preferably be mounted to the actuator housing and the stop element may be positioned within the stop assembly housing. In a preferred embodiment, a first threaded portion for the first and/or second stop member engages and extends into a receptacle such that more than eighty percent of the first threaded portion extending into the receptacle may be threadably engaged so as to be supported within the receptacle.

In another aspect of the invention, a rounded, convex, or tapering end of the first and/or second stop member is engagable with the first stop surface so as to provide a defined point contact therewith.

The present invention also comprises a method for assembling/construction and may comprise steps such as providing the rotary drive element with a first stop surface and a second stop surface such that the first stop surface and the second stop surface are preferably positioned outside of the zone for pressure containment. Other steps may preferably include providing a first stop member for engaging the first stop surface to stop the rotary drive element in a first rotational position wherein the first stop member may be moveable relative to the stop surface for adjusting the first rotational position. Another step comprises providing a second stop member for engaging the second stop surface to stop the rotary drive element in a second rotational position wherein the second stop member may be moveable relative to the stop surface for adjusting the second rotational position.

Additional steps may include one or more of the following: mounting the first stop member and the second stop member within a stop assembly housing, providing an aperture within the stop assembly housing, providing a first radiuused section as part of the aperture adjacent the first stop member, providing a rounded end surface for the first stop member such that the rounded end surface is engagable with the first stop surface, and/or providing support for the first stop member such that the stop member is threadably supported at a position closely adjacent the rounded end.

In another preferred embodiment, a stop assembly housing may be sized to fit into a recess in the actuator housing. The stop assembly housing defines an aperture therein. The first stop member may be mounted within the stop assembly housing such that the first stop member is positionally adjustable and/or the second stop member may also be mounted within the stop assembly housing such that the second stop member is positionally adjustable.

The stop assembly housing is preferably machined for accuracy to a desired size to thereby mate to the recess and the recess in the actuator housing is also preferably machined to a size for receiving the stop assembly housing such that lateral movement of the stop assembly housing within the recess is prevented. In a presently preferred embodiment, the stop assembly housing and the recess are machined to a tolerance of less than or equal to one-one thousandth of an inch for a tight fit of the stop assembly housing within the recess.

In a preferred embodiment, an outer bearing for the rotary drive element is mounted within the stop assembly housing such that the bearing may be on an opposite side of the stop element from the actuator housing. An inner bearing may be provided for the rotary drive element mounted within the actuator housing adjacent the stop assembly housing.

A first relief groove may preferably be defined in the stop assembly housing adjacent the first convex head and/or a second relief groove may preferably be defined in the stop assembly housing adjacent the second convex head.

This aspect of the method for making and/or construction and/or assembly includes machining a receptacle in the actuator housing and machining sides of a stop assembly housing that is insertable into the receptacle. The steps of machining provide a tolerance between the receptacle and the stop assembly housing such that the stop assembly housing is prevented from lateral movement.

For relieving stress in the stop assembly housing, a method of the invention may include steps such as providing an aperture within the stop assembly housing for receiving the rotary drive, providing a first groove along the aperture, and providing a second groove along the aperture. The first stop adjustment member has a first end for engaging the first stop surface and the second stop adjustment member has a second end for engaging a second stop surface. Thus, more specifically the method may include steps such as providing the first groove adjacent the first end, and providing the second groove adjacent the second end.

The first end stop may preferably have a first tapering end which tapers to a first end point and the first tapering end surface may be engagable with the first stop surface for point contact to thereby stop the rotary drive element in a first rotational position. Likewise a second stop member may have a second tapering end which tapers to a second end point. The second tapering end surface may be engagable with the second stop surface for point contact to thereby stop the rotary drive element in a second rotational position.

The present invention preferably utilizes bearings on either side of the stop element to prevent bending of the shaft due to forces applied to the stop element. Thus, another method of the present invention may comprise steps such as installing a first bearing for the rotary drive element for supporting a first end of the rotary drive element, installing an outer bearing for the rotary drive element on an opposite side of the rotary drive element from the first end such that the outer bearing is positioned adjacent the stop element, and installing an inner bearing for the rotary drive element adjacent the stop element on an opposite side of the stop element with respect to the outer bearing.

In a preferred embodiment, the first and second stop members are supported along its length. Thus, the rotary actuator may define a first threaded elongate aperture for receiving the first elongate stop member. The first threaded aperture has a first outer opening for receiving the first elongate stop member. The first threaded elongate aperture has a length of threaded surface such that at least eighty percent of a portion of the first elongate member which extends from the first outer opening to the first end is threadably supported by the length of threaded surface. Moreover, the second elongate stop member may be threaded so as to be moveable along an axis thereof for adjustably engaging the second stop surface. The second elongate stop member has a second end for engaging the second stop surface and the rotary actuator may define a second threaded elongate aperture for receiving the second elongate stop member. The second threaded aperture has a second outer opening for receiving the second elongate stop member. The second threaded elongate aperture has a length of threaded surface such that at least eighty percent of a portion of the second elongate member which extends from the second outer opening to the second end is threadably supported by the length of threaded surface.

While the present invention will be described in connection with presently preferred embodiments, it will be understood that it is not intended to limit the invention to those embodiments. On the contrary, it is intended to cover all alternatives, modifications, and equivalents included within the spirit of the invention.

DETAILED DESCRIPTION OF THE PREFERRED EMBODIMENTS

Figure 1:
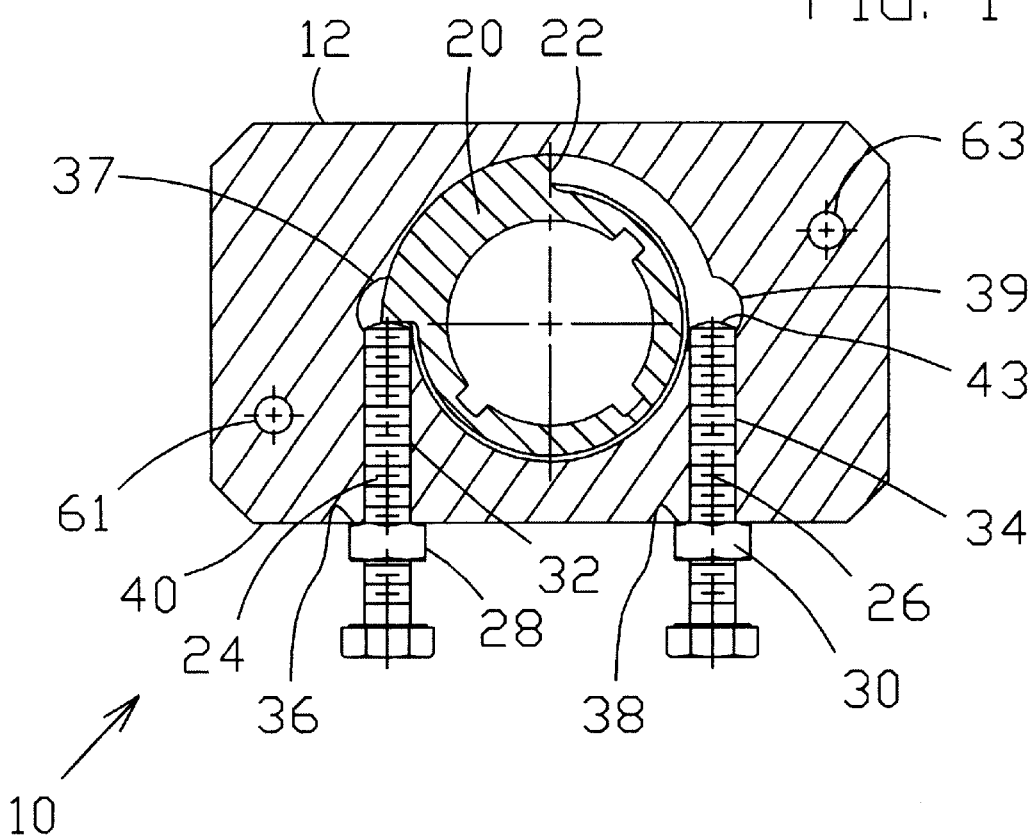
FIG. 1 is an elevational view, partially in section, of a stop assembly housing or adaptor plate in accord with the present invention shown in a first rotational stop.
Figure 2:
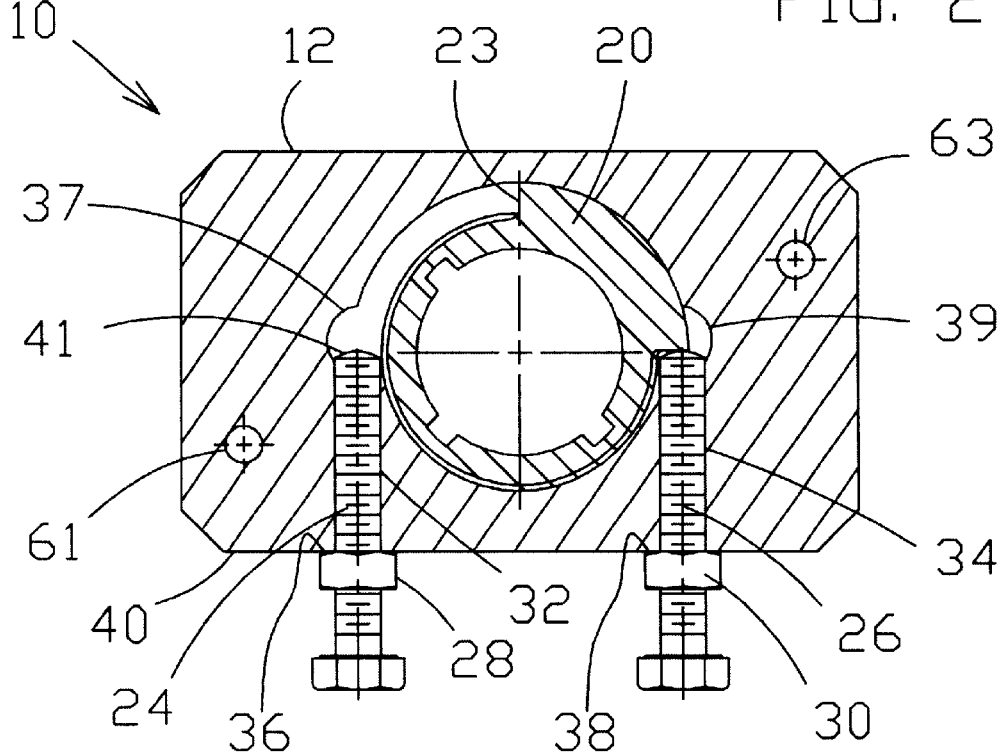
FIG. 2 is an elevational view, partially in section, of the stop assembly housing or adaptor plate of FIG. 1 in a second rotational stop position.
Figure 7:
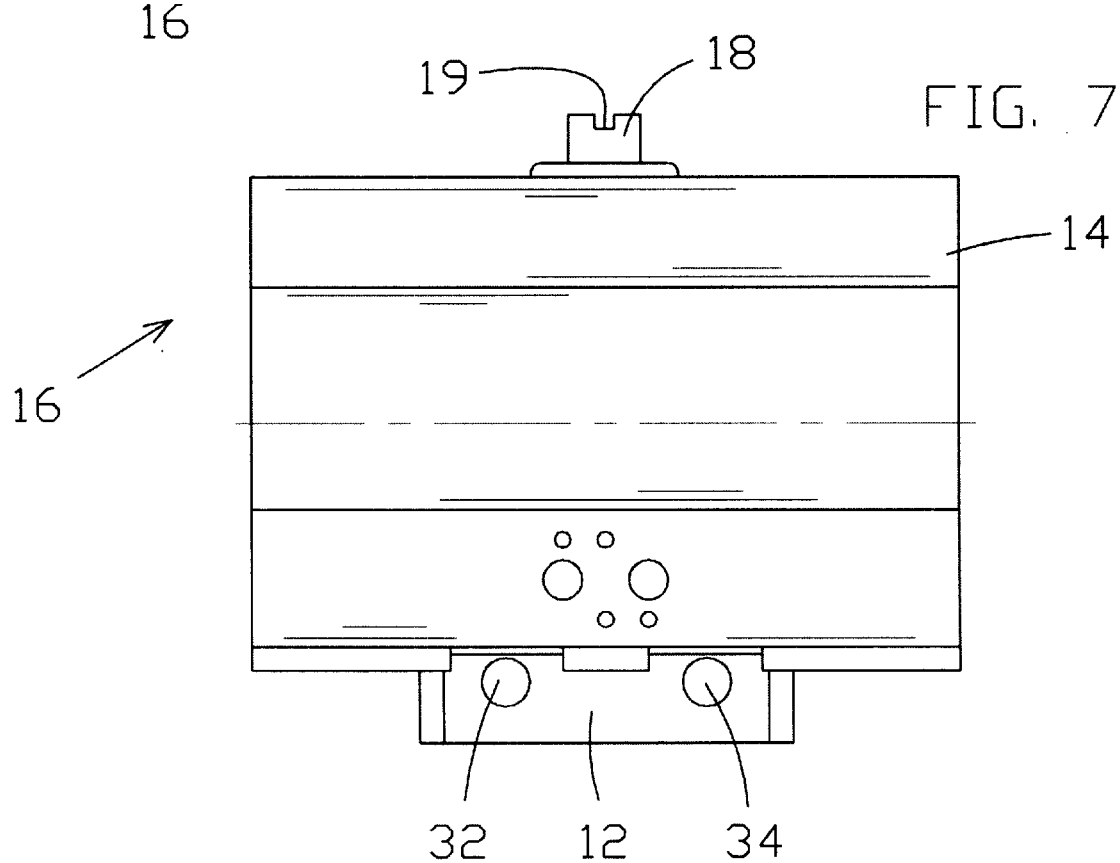
FIG. 7 is an elevational view, of an actuator with apertures in the stop assembly housing for adjustment of the stop positions.
Figure 8:
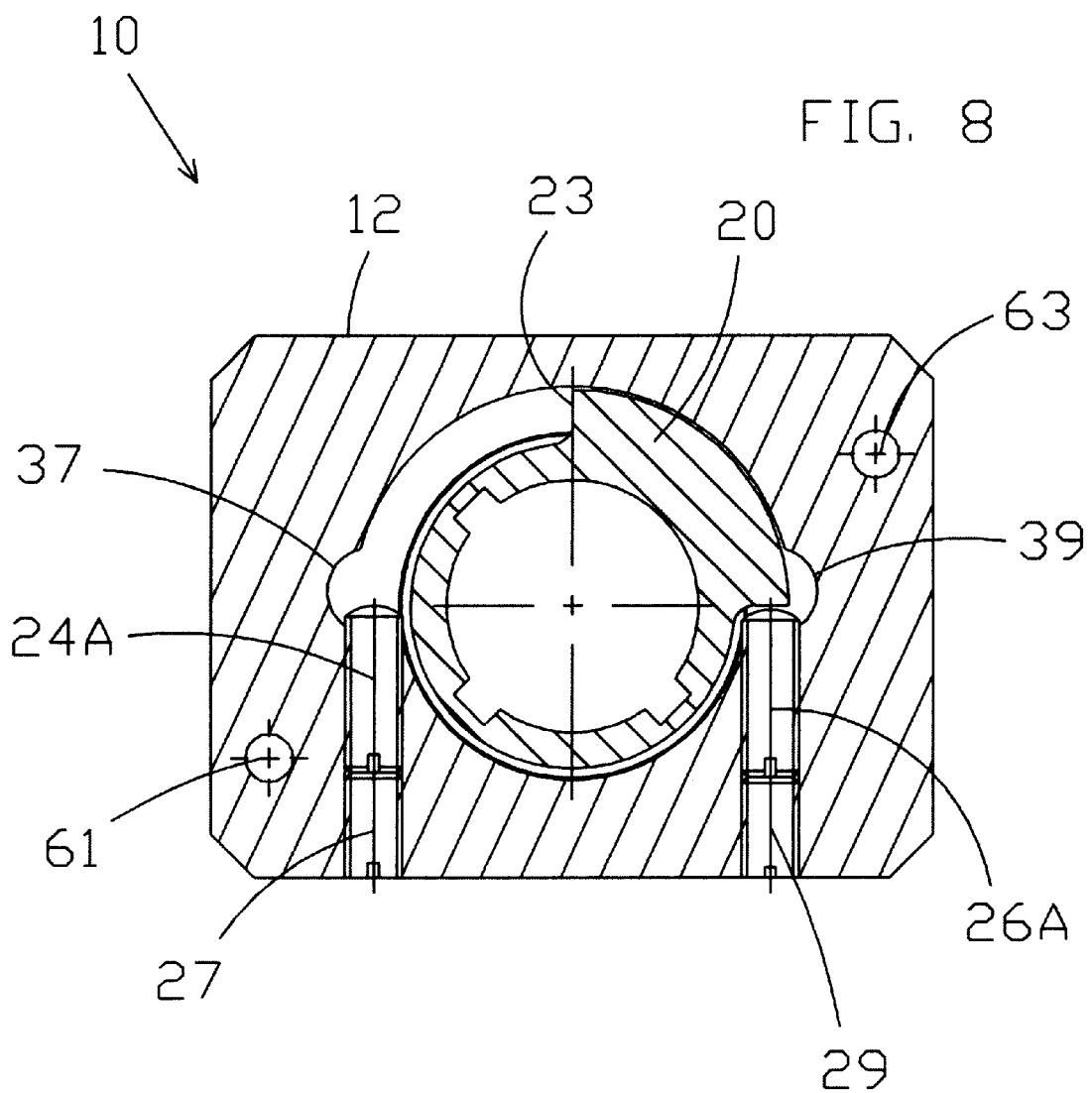
FIG. 8 is an elevational view, partially in section, of an alternative embodiment stop assembly housing or adaptor plate in accord with the present invention.

Referring now to the drawings, and more particularly to FIG. 1, FIG. 2, and FIG. 8, there is shown a dual end stop 10 in accord with the present invention. Dual end stop 10 includes adaptor plate or stop assembly housing 12 which preferably is used to house the various dual end stop components. Stop assembly housing 12 also acts as an adaptor plate to provide a connection or mounting between actuator housing 14, shown in FIG. 4, FIG. 5, FIG. 6, and FIG. 7, and the various types of valves (not shown) which actuator 16 may be mounted to.

Figure 3:
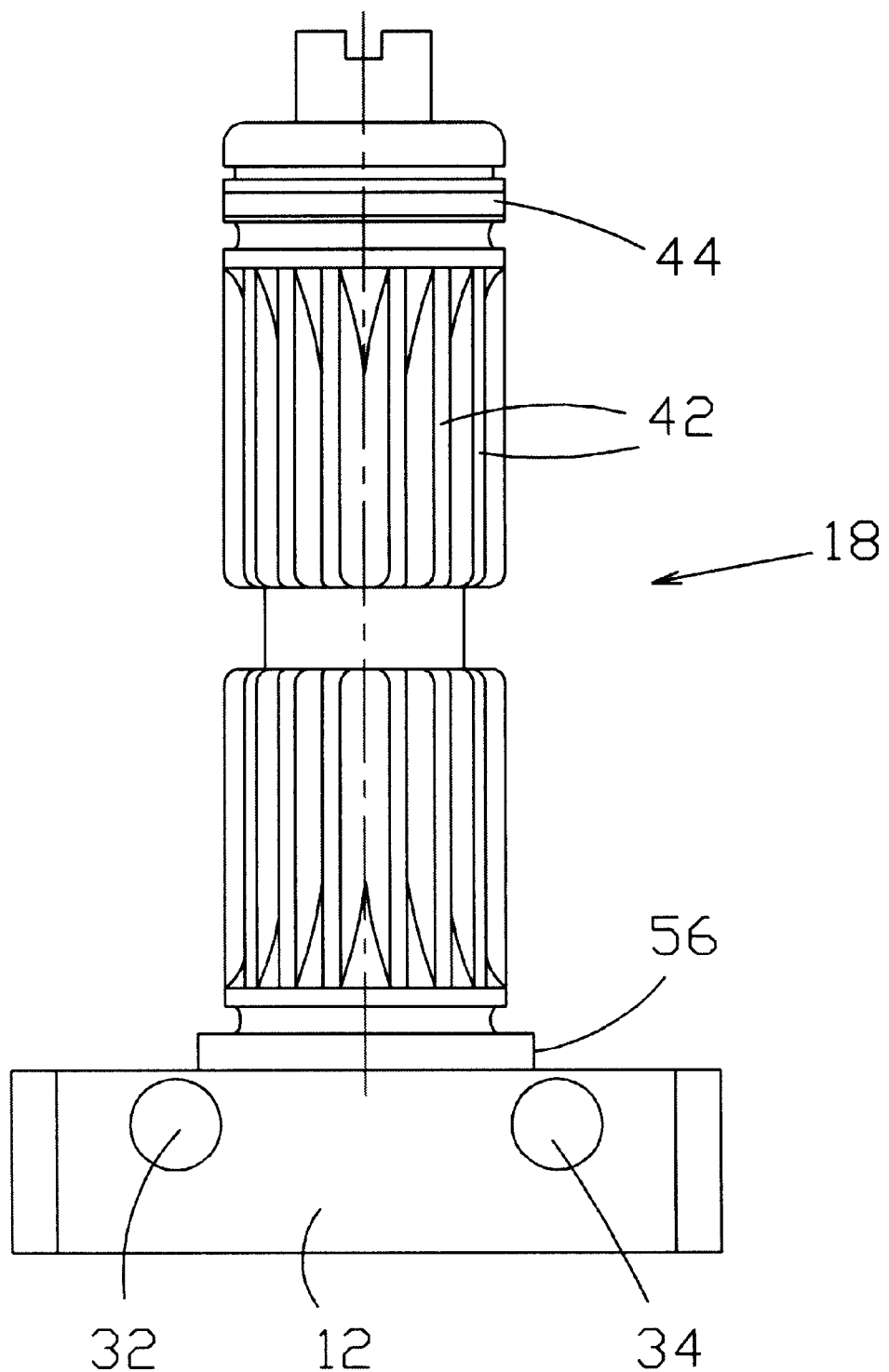
FIG. 3 is an elevational view of a drive shaft mounted on a stop assembly housing in accord with the present invention.
Figure 4:
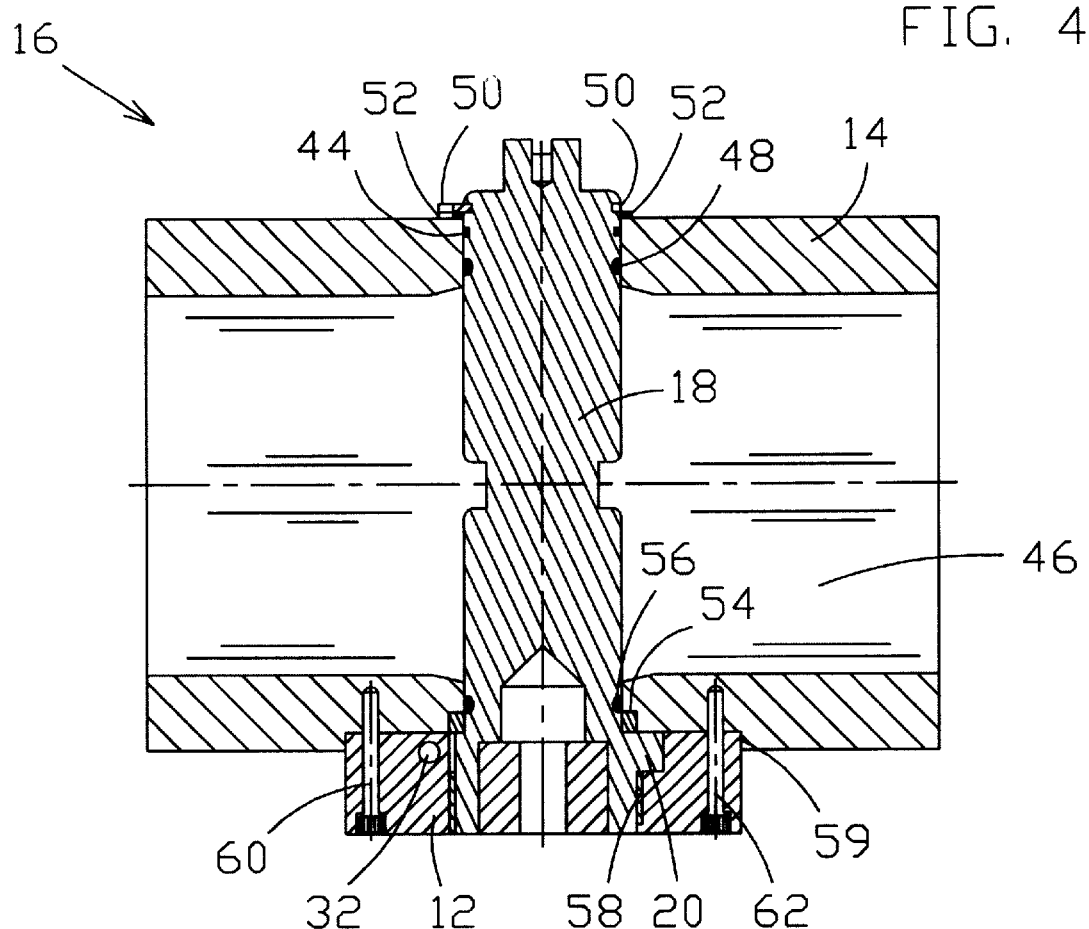
FIG. 4 is an elevational view, partially in cross-section, along sectional view lines 4—4 of the actuator shown in FIG. 5.

It is well known that actuator pistons (not shown) within actuator housing 14 may be used to activate rotary drive element 18, as shown in FIG. 3 and FIG. 4, to rotate in one direction, such as for a quarter turn, and then in the other direction by the same amount to thereby effect opening and closing of the valve. Mounted to or monolithic with rotary drive element 18 is cam member 20 which acts as a stop element affixed to rotary drive element 18. Other shapes and configurations of a stop element such as cam member 20 could also be used. Essentially, a stop element or stop element assembly for dual end stop 10 should comprise at least two stop surfaces, such as first stop surface 22 and second stop surface 23. Rotary drive element 18 and cam 20 then may rotate between a first rotational position as shown in FIG. 1, and a second rotational position as shown in FIG. 2. First and second rotational positions of cam 20 correspond with an open/closed position of the valve. For instance, the position of FIG. 1 may correspond to an open valve and the position of FIG. 2 may correspond to a closed valve.

Dual end stop 10 may be used to accurately set the open and closed position of the valve. For instance, in one embodiment a first stop member such as stop adjustment bolt 24 and a second stop member such as adjustment bolt 26 may be adjusted by about plus and minus two and one-half degrees thereby providing a range of travel for a rotary drive of a quarter-turn actuator, such as rotary drive 18, and the corresponding valve drive shaft, of a range of movement between about eighty degrees and one hundred degrees. Depending on the actuator design and valve operational requirements, a somewhat greater range of adjustment for each stop member could be provided if desired, for instance, about plus and minus five degrees. For convenience of operation, stop adjustment bolts 24 and 26 are threaded bolts although other adjustable members could be used that may include gears, ratchets, and the like that may provide the sufficiently fine adjustments required to set the stops. In a presently preferred embodiment, lock nuts 28 and 30 are used to lock stop adjustment bolts in position to prevent further rotation once the desired stop settings are made. In another embodiment of the invention as shown in FIG. 8, adjustment bolts 24A and 26A are provided in a manner such that the adjustments are tamper resistant. Adjustment bolts 24A and 26A are not immediately available for adjustment thereby reducing the likelihood that inadvertent adjustment might be made by personnel. In this case, in line lock bolts 27 and 29 are used to lock the position of adjustment bolts 24A and 26A, respectively. Lock bolts 27 and 29 cannot be used to make adjustments. Preferably, lock bolts 27 and 29 extend only slightly, if at all, from stop assembly housing 12 to further discourage unneeded adjustments.

A preferred embodiment of the present invention utilizes several different special features to prevent any deformation of stop adjustment bolts 24 and 26 and/or their mounting within stop assembly housing 12. Stop adjustment bolts 24 and 26 are preferably manufactured from high tensile steel.

Preferably stop adjustment bolts 24 and 26 and the corresponding apertures in which they are inserted, such as threaded apertures 32 and 34, are designed for full thread engagement and minimum overhang of stop adjustment bolts 24 and 26 with respect to threaded apertures 32 and 34. For those prior art actuators which may use a rotating stop member, such as cam 20, full thread engagement is not provided. The prior art adjustment bolts extend through the pressurized zone for engaging the stop surfaces and are supported by the actuator housing which is often required to be compact for suitable mounting to the valve. Thus, there is much less support for rotary stop members. On the other hand, the present invention preferably utilizes a separate stop assembly housing preferably mounted outside of the pressurized zone wherein the stop assembly housing preferably doubles as the adaptor plate to provide a compact design. Therefore, adjustment bolts 24 and 26 as well as threaded apertures 32 and 34 can preferably be designed for a minimum overhang. As a general matter, the length of each adjustment bolt 24 and 26, which extends from initial openings 36 and 38 at side wall 40 into stop adjustment housing 12, are threadably engaged for about 95% of this length. Preferably at least 80% of this inserted length of each adjustment bolt 24 and 26 is threadably engaged within threaded apertures 32 and 34. This additional support as compared to prior art designs eliminates any possible deformation or warping of either the adjustment bolts or their associated support structure to thereby provide a more stable dual stop setting adjustment. Thus, the features providing a separate stop assembly housing and of positioning the stop adjustment bolts outside of the pressurized zone within actuator housing 14 for a pneumatic actuator, as further discussed in more detail hereinafter, has significant long term benefits related to more stable stop setting adjustments.

Another preferred feature of the present invention is spherical, convex, rounded, and/or tapered bolt heads or bolt ends 41 and 43 for each respective adjustment bolt 24 and 26. This structure is selected to produce a defined contact point between first and second stop surfaces 22 and 23 and the corresponding stop adjustment bolts 24 and 26. By providing a defined and centralized point contact, load distribution is more uniform and less contact stress occurs on the mating faces. This design avoids the problems of prior art flat head bolts where there is a possibility of a random point contact associated with flat head bolts that may result in a random contact face deformation leading to changing stop adjustment settings as well as random load distribution. Various tapering designs for bolt ends 41 and 43 could be used although a spherical or convex profile is presently preferred.

Relief grooves 37 and 39 are provided adjacent bolt ends 41 and 43, respectively, to thereby reduce stress in plate or stop assembly housing 12. The large blend radius of relief grooves 37 and 39 avoids stress concentrations at the loaded bolt, the adjacent restraining bolt holes 61 and 63, and the edge of stop bolt apertures 24 and 34. This in turn avoids the possibility of fatigue cracks propagating and ensures the present design has a superior fatigue life. In one finite analysis test, this design suggests the possibility of more than fifty million cycles of repeated loadings without failure due to fatigue.

Figure 5:
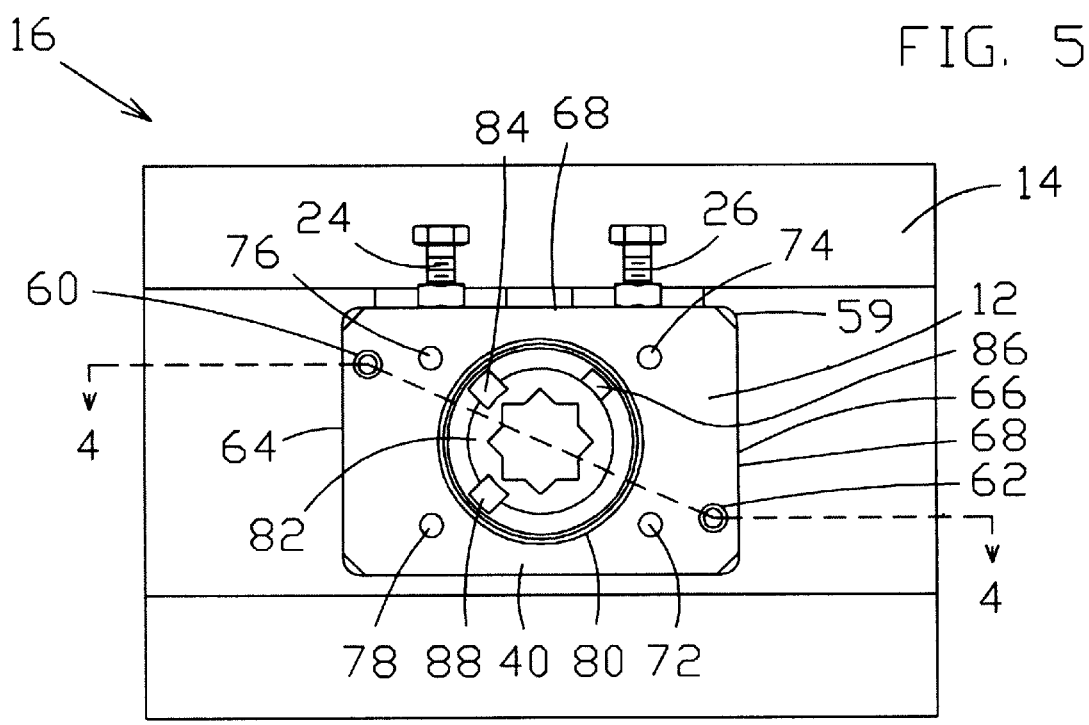
FIG. 5 is an elevational view of an actuator in accord with the present invention showing a stop assembly housing mounted to the actuator housing.

FIG. 3, FIG. 4, and FIG. 5 show the structural relationship between rotary shaft 18, actuator housing 14, and stop assembly housing 12. Referring to FIG. 3, a preferred rotary actuator shaft 18 is shown which may be rotated by gear teeth 42 and corresponding gear teeth on the pistons and/or piston shaft (not shown). In a preferred embodiment, rotary actuator shaft 18 is supported by three bearings including top bearing 44 which may preferably be a split bearing for supporting actuator shaft 18 on one side of actuator housing 14. Actuator shaft 18 extends through pressurized zone 46 of actuator housing 14 and may, as shown in FIG. 4, extend through both sides of actuator housing 14. Actuator shaft 18 is sealed adjacent bearing 44 by seal 48, which may preferably be an O-ring or elastomeric seal. Retaining clip 50 and corresponding rubbing ring 52 may be used to secure the axial position of actuator shaft 18 with respect to actuator housing 14 while permitting rotation of actuator shaft 18.

It will be understood that such terms as "up," "down," "vertical," and the like, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. As well, the relative size of the components may be greatly different from that shown.

Actuator shaft 18 is also supported by lower bearing 54 on the opposite side of actuator housing 14 from bearing 44. Lower seal 56, which may preferably be an elastomeric or O-ring seal, seals around actuator shaft 18 adjacent to bearing 44. In a preferred embodiment, lower bearing 54 is provided within actuator housing 14 adjacent to stop assembly housing 12 and directly adjacent to one side of cam 20. Another bearing 58 is preferably provided within stop assembly housing 12 on the opposite side of cam 20 from lower bearing 54. The use of bearing 54 and bearing 58 on either side of cam 20 ensures that no deflection of actuator shaft 18 will occur even under maximum applied loads. Thus, forces applied to cam 20 by stop adjustment members 24 and 26 against corresponding stop surfaces 22 and 23 will not cause deflection of actuator shaft 18.

It will also be seen from FIG. 4 that stop assembly housing 12 is preferably outside of pressure zone 46 which is sealed by seal 56. Thus, stop assembly housing 12 and the related components including stop adjustment members 24 and 26 as well as cam 20 with associated stop surfaces 22 and 23 are all preferably positioned outside of pressurized zone 46 contained within actuator housing 46. For safety and hygienic reasons, the stop surfaces and stop members are also preferably not open to ambience so fingers cannot be inserted therein and debris is prevented from reaching the stop surfaces and stop members.

In a preferred embodiment, stop assembly housing 12 is designed to be securely supported within recess 59 in actuator housing 14. The fit between recess 59 and stop assembly housing 12 is preferably a very tight fit with tolerances in the range of about one-one thousandth of an inch. By providing a tight fit between stop assembly housing 12 and recess 58 in actuator housing 14, the connection between these components is not only very accurate but also very strong and resists torque, lateral movement, and other operating forces/stresses. In fact, in a preferred embodiment only two bolts such as bolts 60 and 62 are required because the only function of the bolts is to hold stop assembly housing 12 within recess 59. The position of stop housing 12 is already fixed. Preferably both recess 59 and sides 40,64, 66, and 68 of stop assembly housing 12 are milled rather than cast or molded to achieve the desired accuracy of fit. In this manner, the adaptor plate, with or without the stop assembly, can be attached to the actuator housing for a more precise fit that can be made to conform with various standards such as ISO standards that are used internationally for connecting actuators to valves such that the actuator and valve shafts align precisely. Due to the costs of machining, the ability to use only two bolts to secure stop assembly housing 12 to actuator housing 14 may result in reduced machining costs, depending on the number and spacing of other holes, such as valve mounting holes 72,74,76, and 78 as well as alignment ring 80. The valve mounting configuration on stop assembly housing 12 can be made to suit for CEN, ISO, or customer valve mounting configuration requirements. Shaft insert 82 will also suit standards such as ISO or customer valve requirements. The availability of three key slots 84,86, and 88 rather than just the two, in this case slots 84 and 88, allows ninety degree rotation of shaft insert 82 as desired for proper mating to the valve.

Figure 6:
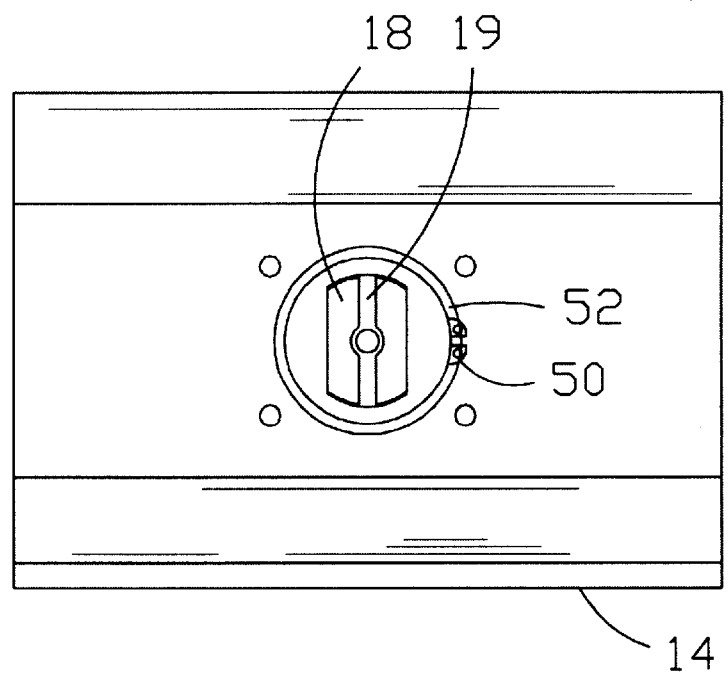
FIG. 6 is an elevational view, of an actuator with a drive shaft extending therethrough.

FIG. 6 and FIG. 7 show external views of actuator 16 including relative location of shaft 18, with valve position indicator 19 on one side of actuator housing 14, and an adaptor plate which also preferably comprises stop assembly housing 12 on the opposite side thereof.

It will be seen that various changes and alternatives may be used that are contained within the spirit of the invention. For instance, the mounting of the adaptor plate may be used whether or not the adaptor plate is also used as stop assembly housing 12 as is the presently preferred embodiment of the invention.

The foregoing disclosure and description of the invention is illustrative and explanatory thereof, and it will be appreciated by those skilled in the art, that various changes in the size, shape and materials, the use of mechanical equivalents, as well as in the details of the illustrated construction or combinations of features of the various elements may be made without departing from the spirit of the invention.

What is claimed is:

1. A dual end stop for a valve actuator, said valve actuator comprising an actuator housing, said actuator housing having a zone for pressure containment, a rotary drive element rotatably mounted within said actuator housing, a stop element having a first stop surface and a second stop surface, said dual end stop comprising:

a first stop member having a first end stop, said first end stop having a first tapering end which tapers to a first end point, said first tapering end point being engageable with said first stop surface for point contact to thereby stop said rotary drive element in a first rotational position, said first stop member being moveable in a direction substantially perpendicular to a position of said first stop surface when said first stop member engages said first stop surface throughout an entire range of adjustment of first stop member with respect to said first stop surface; and a second stop member having a second end stop, said second end stop having a second tapering end which tapers to a second end point, said second tapering end point being engagable with said second stop surface for point contact to thereby stop said rotary drive element in a second rotational position. said second stop member being moveable in a direction substantially perpendicular to a position of said second stop surface when said second stop member engages said second stop surface throughout an entire range of adjustment of second stop member with respect to said second stop surface.

2. The dual end stop of claim 1, further comprising:

a first position of said point contact between said first tapering end point and said first stop surface, said first position remaining substantially constant over said entire range of adjustment of first stop member with respect to said first stop surface.

3. The dual end stop of claim 1, further comprising:

a stop assembly housing mountable to said actuator housing, said first stop member and said second stop member being mountable within said stop assembly housing.

4. The dual end stop of claim 3, further comprising:

at least one bearing for said rotary drive clement mounted within said stop assembly housing.

5. The dual end stop of claim 1, wherein said first stop member and said second stop member are mounted outside of said zone for pressure containment.

6. A method for a dual end stop for a valve actuator, said valve actuator having an actuator housing, said actuator housing having a zone for pressure containment, a rotary drive element rotatably mounted within said actuator housing, a stop clement having a first stop surface and a second stop surface, said dual end stop comprising:

providing a first stop member with a first end stop having a first tapering end surface, said first tapering end surface being engagable with said first stop surface for slopping said rotary drive element in a first rotational position; and providing a second stop member with a second end stop having a second tapering end surface, said second tapering end surface being engagable with said second stop surface for stopping said rotary drive element in a second rotational position.

providing that said first stop member is moveable along a first adjustment path;

providing that said second stop member is movable along a second adjustment path;

providing that said first adjustment path and said second adjustment path are parallel;

providing that said first adjustment path is substantially perpendicular to said first stop surface when said first stop member engages said first stop member; and providing that said second adjustment path is substantially perpendicular to said second stop surface when said second stop member engages said second stop member.

7. The method of claim 6, further comprising:

forming a first tapering end surface with a convex profile, and forming said second tapering end surface with a convex profile.

8. The method of claim 6, further comprising:

providing a stop assembly housing mountable to said actuator housing, and mounting said first stop member and said second stop member within said stop assembly housing.

9. The method of claim 8, further comprising:

mounting a bearing within said stop assembly housing for supporting said rotary drive element.

10. The dual end stop of claim 6, further comprising:

mounting said first stop member and said second stop member outside of said zone for pressure containment.

* * * * *

UNITED STATES PATENT AND TRADEMARK OFFICE
CERTIFICATE OF CORRECTION

PATENT NO.      : 6,655,256 B2
DATED           : December 2, 2003
INVENTOR(S)     : Leopold J. Niessen It is certified that error appears in the above-identified patent and that said Letters Patent is hereby corrected as shown below:

<u>Column 10,</u>
Line 15, delete "clement" and replace with -- element --.
Line 20, delete "slopping" and replace with -- stopping --.

Signed and Sealed this

Thirteenth Day of July, 2004

JON W. DUDAS
*Acting Director of the United States Patent and Trademark Office*